United States Patent
Brunnett et al.

(10) Patent No.: US 7,230,789 B1
(45) Date of Patent: Jun. 12, 2007

(54) METHOD AND APPARATUS FOR PERFORMING A SELF-SERVO WRITE OPERATION IN A DISK DRIVE USING SPIRAL SERVO INFORMATION

(75) Inventors: Don Brunnett, Pleasanton, CA (US); Yu Sun, Fremont, CA (US); Lin Guo, Milpitas, CA (US)

(73) Assignee: Maxtor Corporation, Scotts Valley, CA (US)

( * ) Notice: Subject to any disclaimer, the term of this patent is extended or adjusted under 35 U.S.C. 154(b) by 190 days.

(21) Appl. No.: 11/102,467

(22) Filed: Apr. 8, 2005

Related U.S. Application Data

(60) Provisional application No. 60/560,548, filed on Apr. 8, 2004.

(51) Int. Cl.
*G11B 21/02* (2006.01)
(52) U.S. Cl. .................................................. 360/75
(58) Field of Classification Search .................. 360/75, 360/77.04, 77.11, 48, 51
See application file for complete search history.

(56) References Cited

U.S. PATENT DOCUMENTS

| | | | |
|---|---|---|---|
| 6,714,376 B1 | 3/2004 | Brunnett et al. | 360/75 |
| 6,977,789 B1 * | 12/2005 | Cloke | 360/75 |
| 6,985,316 B1 | 1/2006 | Liikanen et al. | 360/29 |
| 7,019,937 B1 | 3/2006 | Liikanen et al. | 360/77.11 |
| 7,088,533 B1 * | 8/2006 | Shepherd et al. | 360/51 |
| 7,123,433 B1 * | 10/2006 | Melrose et al. | 360/77.04 |
| 7,136,253 B1 * | 11/2006 | Liikanen et al. | 360/77.11 |
| 7,149,044 B1 * | 12/2006 | Chen et al. | 360/48 |
| 7,149,048 B1 * | 12/2006 | Ray et al. | 360/77.04 |
| 7,154,689 B1 * | 12/2006 | Shepherd et al. | 360/48 |

OTHER PUBLICATIONS

U.S. Appl. No. 10/858,846, filed Jun. 2, 2004, Everett et al.
U.S. Appl. No. 10/858,847, filed Jun. 2, 2004, Liikanen et al.
U.S. Appl. No. 10/859,058, filed Jun. 2, 2004, Rewerts et al.
U.S. Appl. No. 10/859,061, filed Jun. 2, 2004, Jeong et al.
U.S. Appl. No. 10/859,062, filed Jun. 2, 2004, Liikanen et al.
U.S. Appl. No. 10/859,068, filed Jun. 2, 2004, Ray et al.

* cited by examiner

*Primary Examiner*—Fred F. Tzeng
(74) *Attorney, Agent, or Firm*—Fellers, Snider, et al.

(57) ABSTRACT

The present invention is directed to a method and apparatus for performing a self-servo write operation in a disk drive. In one embodiment, the disk drive includes a disk surface having a read head and a write head associated therewith. Spiral servo information is written onto the disk surface using a servo track writer. The read head reads the spiral servo information and is used to position the write head, which writes a small band of final servo information onto the disk surface. The small band of final servo information may be embedded servo information. Importantly, the small band of final servo information is not written using the servo track writer. The write head is also used to write self-servo write instructions into the small band of final servo information. Subsequently, the self-servo write instructions are read and a self-servo write operation is performed using the spiral servo information.

26 Claims, 13 Drawing Sheets

METHOD AND APPARATUS FOR PERFORMING A SELF-SERVO WRITE OPERATION IN A DISK DRIVE USING SPIRAL SERVO INFORMATION

CROSS-REFERENCE TO RELATED APPLICATIONS

Priority is claimed from U.S. Provisional Patent Application Ser. No. 60/560,548 filed Apr. 8, 2004, which is incorporated herein by reference in its entirety.

FIELD OF THE INVENTION

The present invention relates generally to data storage devices, such as disk drives. More particularly, the present invention relates to a method and apparatus for performing a self-servo write operation in a disk drive using spiral servo information.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the number of spirals of servo information to be written, rather than the number of tracks.

FIG. 6 is a diagrammatic representation of a magnified view of a portion of FIG. 5 showing additional spirals of servo information (i.e., portions of four spirals are shown in FIG. 6). Furthermore, FIG. 6 is shown in a linear, instead of arcuate fashion, for ease of depiction.

At any given track 220 (Data Tracks 24–40 are depicted in FIG. 6), the disk drive's read head 230 (also referred to herein as the reader) crosses over the spirals of servo information at intervals equal to the sample rate. Furthermore, the read head 230 crosses over the spirals of servo information at an angle. Additionally, the number of spirals of servo information that cross each of the tracks 220 is equivalent. For a given track 220, the spacing between adjacent spirals of servo information is approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 6; (2) time increases in the figure from right to left along the horizontal; and, (3) the disk is rotating in the direction indicated by corresponding arrow shown in FIG. 6. If the read head 230 was placed above Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

FIG. 7 is a diagrammatic representation of a magnified portion of one of the spirals of servo information shown in FIG. 6. FIG. 7 is intended to provide a representation of the track pitch (TP) of a circumferential data track and the reader width (RW). The spiral 700 is a continuous, single-frequency pattern having sync marks 702 embedded therein. The sync marks 702 constitute phase shifts within the spiral pattern. In FIG. 7, the sync marks 702 are shown as regularly-spaced white areas within the spiral 700.

FIG. 8 is a diagrammatic representation of a read signal that is generated as the reader 230 reads a portion of a spiral of servo information while the disk is spinning. In FIG. 8, the x-axis represents time, while the y-axis represents signal amplitude. The depicted shape is known herein as the read signal envelope 802.

In general, the shape of each read signal envelope 802 will be approximately the same (e.g., roughly a football shape) over the entire disk surface. The position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference.

A position error signal (PES) is determined by calculating the position of the reader relative to a known reference point (i.e., one of the sync marks) within the spiral servo pattern. The position of the reader is given by the centroid of the read signal envelope and is determined by integrating the read signal envelope over a hardware integration window of fixed-size (described in more detail below) to determine the read signal envelope's area (i.e., by performing a power integration) and, then, dividing by two. This is known as the half-integrator value.

A diagrammatic representation of an integration curve 902 in normalized units is shown in FIG. 9. The position of the reader is at 1.5 arbitrary units along the x-axis, where half of the integrated value of the read signal envelope is to the right of the position of the reader and half of the integrated value of the read signal envelope is to the left of the position of the reader.

As mentioned above, once the position of the reader is determined (i.e., by determining the half-integration value), the PES is determined by comparing the position of the reader relative to one of the sync marks. FIG. 10 is a diagrammatic representation illustrating five (5) sync marks in the read signal envelope.

To determine the time at which the half integrator value occurs, it is necessary to record the integration values at various sample points over the integration interval, wherein the integration interval is defined by the integration window. One convenient sample interval is the same as the sync mark-to-sync mark interval. This sample interval "frames" a sync mark and, therefore, is known as the frame interval (or frame). The spiral energy integration value is determined at each frame interval and accumulated, so that the time of the reader position can be calculated after the entire spiral has passed under the reader. An example of saved integrator values is shown in FIG. 11. It should be noted that the values in FIG. 11 do not correspond to the read signal envelope of FIG. 8. Instead, the values in FIG. 11 are based on an altogether different read signal envelope.

To reference the position of the reader relative to a sync mark, the time at which each occurs must be known. The time of the reader position is found by searching the array of integrator values to find the corresponding frame interval containing the half integrator value. Linear interpolation is used to find the exact time of the half-integrator value relative to one of the end points of the frame interval. The interpolation uses the saved integrator values on either side of the half-integrator value to compute a localized slope of the integrator around the head position. The localized slope calculation incorporates the change in integrator values over a known distance.

To reference the reader position to the known reference points in the spiral, the time is saved at which each sync mark is detected. Because the frame interval is the same as the sync to sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the reader position and (2) the beginning of the frame interval to the sync position. The difference in time is then scaled to position by the relationship between the sync-to-sync spacing of radius and time.

Once the reader position is referenced to a sync mark, a determination must be made as to whether the reader position and the sync mark are the desired, or targets, of the track following system. If the reader position is found to be 10% away from a sync mark, but the sync mark is actually 1 away from the target sync mark, then the sync to sync spacing must be added to the reader position to demodulate the full reader position. For example, if there were 4 sync marks per track, then the sync spacing is 25% of a track. If the reader position is found to be 10% away from a sync mark and the sync mark is 1 away from the target sync mark, then the position of the reader would be demodulated as 35% of a track away from the target location.

FIG. 12 is a schematic representation of an integration window (or gate) 1202 and a read signal envelope 1204. The integration window 1202 is opened around the expected position of the read signal envelope 1204. In FIG. 12, the read signal envelope 1204 is centered in the integration window 1202. In such case, the position error signal (PES) would be zero.

FIG. 13A is a schematic illustration of a read signal envelope 1304 that is centered in the integration window 1302 (i.e. the PES should be zero). FIG. 13B is a schematic illustration of a curve representing accumulated integration values across the integration window, wherein each dot represents accumulated integration values at a frame.

As described in U.S. patent application Ser. No. 10/859, 062 filed Jun. 2, 2004, which is incorporated herein by reference, the assignee of the present invention has developed a technique of self-servo writing using spiral servo information. Specifically, with reference to FIG. 14, at a first station, a STW is used to write spirals of servo information onto the disk surface by moving a write head in a controlled (closed-loop) manner (e.g., at a constant velocity or along a velocity profile) across the disk surface while the disk is spinning (step 1410).

After all of the spirals have been written, a small band of conventional servo information (e.g., embedded servo information) is written onto the disk surface (e.g., near its inner diameter or the outer diameter) using the STW (step 1420). In one embodiment, a portion of the small band of conventional servo information is written at a radial location that overlaps with a radial location where spiral servo information has been written. In one embodiment, the number of servo spokes in the small band of conventional servo information corresponds to the number of spirals.

The small band of conventional servo information provides an absolute reference point (in both the radial and circumferential sense) on the disk surface. More specifically, conventional servo sectors in the small band of conventional servo information include both a track number (to provide a radial reference point) and a sector number (to provide a circumferential reference point). Final servo patterns may be written relative to this absolute reference point.

The small band of conventional servo information occupies less than 3% of the disk surface. More preferably, the small band of conventional servo information occupies less than 1% of the disk surface. Even more preferably, the small band of conventional servo information occupies less than 0.4% of the disk surface.

Next, the disk drive is moved out of the first station and into another station, so as to free-up the STW for other disk drives. At the second station, which includes a host connection, self-servo writing instructions and other information (e.g., drive firmware, self-test script, read channel parameter tables and defect management lists) are written into a utility zone, which is comprised of a portion (e.g., a few tracks) of the small band of conventional servo information (step 1430).

In one embodiment, the self-servo writing instructions and other information may be written to a temporary utility zone and then moved to a final utility zone as discussed in U.S. patent application Ser. No. 10/859,058 entitled "Method And Apparatus For Providing A Temporary Utility Zone In A Disk Drive" filed on Jun. 2, 2004 and incorporated herein by reference. U.S. Provisional Patent Application Ser. No. 60/475,097 filed Jun. 2, 2003 (from which the above-identified patent application claims priority) is also incorporated herein by reference.

It should be noted that, prior to writing any information into the utility zone, the read head comes ready on the small band of conventional servo information and the small band of conventional servo information (including the utility zone) is scanned for defects. Areas containing flaws are mapped out, so that they will not be used.

There are several techniques for bringing the read head to a ready position on the small band of servo information. One technique is described in U.S. Provisional Patent Application Ser. No. 60/475,039 entitled "BEMF Controlled Push Off/Acquire" filed Jun. 2, 2003, which is incorporated herein by reference.

Next, the disk drive is moved to a third station, where no host connection or other mechanical components need to access the drive. The disk drive is powered-on (e.g., with its normal supplies of +12 V and +5 V) and reads the self-servo writing information included in the utility zone, so as to undergo a self-servo write process using the spirals of servo information (step 1440). In one embodiment, the final servo pattern looks like the conventional servo pattern of FIG. 3.

It should be noted that, prior to reading the self-servo writing information, the read head comes ready (as in station 2) on the small band of servo information and locks to the absolute reference point (i.e., in time and position). Then, the drive code, manufacturing diagnostic code and self-test script (among which the self-servo writing information is included) are read.

FIG. 15 is used to describe a technique for moving from servoing on the small band of conventional servo patterns to servoing on the spiral servo information.

First, the read head (or, reference surface head, if servo information will be written on multiple disk surfaces) is moved near the edge of the small band of conventional servo information (e.g., to the edge of the utility zone) and a track following operation is performed on the conventional servo information (step 1510).

When the small band of conventional servo information was written onto the disk surface, preferably, a portion of the small band of conventional servo information was written at a radial location that overlapped with a radial location where spiral servo information was written. Therefore, spirals (e.g., the ends of spirals) should be located between adjacent servo sectors of the conventional servo information at some track within the small band of conventional servo sectors (preferably, close to its edge).

Next, the read head is used to find spiral servo information between conventional servo information (step 1515). Once one spiral of servo information has been found, the other spirals of servo information can be found because the spirals are encountered at known time intervals (e.g., constant intervals at a radius). As is well known to those skilled in the art, conventional servo sectors are also encountered at known time intervals while reading a particular track.

An initial calibration is performed of servo sector timing to spiral timing (step 1520). Finally, the disk drive switches from track following on the conventional servo information to track following on the spiral servo information (step 1525).

Track following may be performed in conjunction with some of the techniques described in U.S. patent application Ser. No. 10/858,847 entitled "Method And Apparatus For Providing Multi-Point Position Demodulation Of A Read Head When Using Spiral-Written Servo Information" filed on Jun. 2, 2004 and incorporated herein by reference. U.S. Provisional Patent Application Ser. No. 60/475,049 entitled "Multi-Point Position Demodulation" filed Jun. 2, 2003 (from which the above-identified patent application claims priority) is also incorporated herein by reference.

Furthermore, track following may be performed in conjunction with some of the techniques described in U.S. patent application Ser. No. 10/858,839 entitled "Method And Apparatus For Determining A Transducer's Reference Position In A Disk Drive Having A Disk Surface With Spiral Servo Information Written Thereon" filed on Jun. 2, 2004 and incorporated herein by reference. U.S. Provisional Patent Application Ser. No. 60/475,098 entitled "Virtual Integration Window For Spiral Position Demod" filed Jun. 2, 2003 (from which the above-identified patent application claims priority) is also incorporated herein by reference.

Once track following on the spiral servo information, the initial timing calibration value is used to indicate the location of the first portion of the self-servo written information. A number of revolutions are also spent at the first location to establish an initial timing reference of a disk locked clock.

It should be understood that there are other techniques for moving the read head from a position where it is not track following on spiral servo information to a position where it is track following on spiral servo information. One such technique is described in U.S. patent application Ser. No. 10/858,846 entitled "Method And Apparatus For Acquiring Onto Spiral Servo Information Written On A Disk Surface Of A Disk Drive" filed on even date herewith and incorporated herein by reference. U.S. Provisional Patent Application Ser. No. 60/475,051 entitled "Asynchronous Pushoff And Acquire Onto Spiral Written Servo Format" filed Jun. 2, 2003 (from which the above-identified application claims priority) is also incorporated herein by reference.

Because the spiral servo information is used to write final servo patterns onto the disk surface, it is beneficial to account for the repeatable runout in the spiral servo information before writing the final servo patterns. One technique for accounting for repeatable runout is described in U.S. patent application Ser. No. 10/859,068 entitled "Method And Apparatus For Improving Spiral-Based Position Correction System Stability Via Kernel Frequency Component Modification" filed on Jun. 2, 2004 and incorporated by reference. The above-identified patent application claims priority from both U.S. Provisional Patent Application Ser. No. 60/475,114 filed Jun. 2, 2003 entitled "Methods To Improve Spiral-Based Position Correction System Stability Via Kernel Frequency Component Modification" filed Jun. 2, 2003 and U.S. Provisional Patent Application Ser. No.

60/475,129 entitled "Integrating Spiral Position Correction System" filed Jun. 2, 2003, both of which are incorporated herein by reference.

As described in the above-identified patent applications, position correction values (to account for repeatable runout) are continuously modified, via integration, while tracking, as opposed to recalculating the correction values at every track. This is accomplished by taking advantage of the high degree of correlation in the repetitive runout in neighboring tracks and, therefore, less processing time is used. Accordingly, once the read head is track following on spiral servo information, initial values for position correction values may be obtained by gathering data over a few revolutions of the disk surface. Furthermore, in one embodiment, data is also gathered (over the few revolutions) to characterize the servo system (plant). Calculation, application and verification of the characterization is performed for the track over which the read head is track following.

Once the repeatable runout has been accounted for, final servo information is written onto the disk surface by the disk drive's write head. In order to move from to a new location while servoing on the spiral servo information, an incremental seek operation, equivalent to one spiral servo pattern step, is performed.

One technique for performing an incremental seek operation is described in U.S. patent application Ser. No. 10/858,830 entitled "Method And Apparatus For Performing Seek Operations In A Disk Drive Having A Disk Surface With Spiral Servo Information Written Thereon" filed on Jun. 2, 2004 and incorporated herein by reference. The above-identified patent application claims priority from both U.S. Provisional Patent Application Ser. No. 60/475,112 filed entitled "Incremental Seeking On Spiral Written Servo Format" filed Jun. 2, 2003 and U.S. Provisional Patent Application Ser. No. 60/475,127 entitled "Constant Acceleration Seek Algorithm For Spiral-Based Positioning System" filed Jun. 2, 2003, both of which are incorporated herein by reference.

While the incremental seek operation is being performed, track ID values and the final servo pattern for the next track are calculated and loaded into a write buffer. Timing corrections are applied to the disk-locked clock, since spiral timing has changed due to movement in a radial direction. Then, the track ID values and the final servo pattern are written to the disk surface (or disk surfaces), in the same manner that customer data is written (e.g., using the disk drive's write head).

Position correction values are updated, while track following, using spiral servo information from the new radial location. Because the repeatable runout is highly correlated from track-to-track, as described above, it is not necessary to gather completely new position correction values while track following for many revolutions. (However, it should be understood that, in some embodiments, this can be done.)

An incremental seek is performed again to move to the following radial location and the updated position correction values are used to reduce repeatable runout before writing the final servo information at this location. The above process is then repeated until final servo patterns have been written over substantially all of the disk surface (or disk surfaces). Once the disk drive has been formatted with the final servo patterns, it will appear as a "normal" drive, which is ready for standard self-test processes.

It should be noted that in addition to compensating for repeatable runout, compensation may also be provided for repeatable timing errors, so as to reduce timing errors in the final servo pattern. One method of compensating for repeatable timing errors is discussed in U.S. Provisional Patent Application Ser. No. 60/475,115 entitled "Integrating Spiral Timing Correction System" filed Jun. 2, 2003 and incorporated herein by reference.

When servoing on spiral servo patterns to write final servo patterns, the time of writing may coincide with the time of reading spiral servo information. Because a transducer cannot read and write at the same time, there is a conflict. This is referred to as a "collision" of the spiral servo information with the final servo pattern.

Collisions occur because, as the head moves from track to track, the spirals shift in time relative to the final pattern that is being written. Collisions occur even though the write head and the read head are physically offset.

FIG. 16 is used to describe a technique for avoiding collisions. In this embodiment, two times the number of spirals of servo information are written as compared to the number of servo spokes in the final servo pattern (step 1610). For example, if the final servo pattern was to have 192 servo spokes, then 384 spirals would be written.

The spirals are grouped into two sets, wherein adjacent spirals are in different sets. Accordingly, if the spirals were numbered consecutively around the disk surface, a first set of spirals would comprise odd-numbered spirals and a second set of spirals would comprise even-numbered spirals.

While writing final servo patterns onto the disk surface, the read head servos on one of the two sets of spirals. For example, the read head servos on the odd set of spirals (step 1620). In this embodiment, the sample rate will be equal to half of the number of spirals written onto the disk surface (e.g., if using the above example, the sample rate will be 192).

Before a known collision point, the read head switches to servoing on the other set of spirals, so as to avoid a collision. In this example, the read head will switch to servo on the even set of spirals (step 1630). Preferably, the switch will occur halfway between the known collision points.

Switches are made, back and forth, to avoid collisions, until all of the final servo patterns are written to the disk surface. Collision points can be calculated by those skilled in the art.

U.S. Pat. No. 6,714,376 to Brunnett et al. entitled "Partial Servo Write Fill In" describes a somewhat similar technique. U.S. Pat. No. 6,714,376 is assigned to the assignee of the present invention and is incorporated herein by reference.

In one embodiment, even though the read head is positioned based upon a servo sample rate that is equal to half of the number of spirals written onto the disk surface (e.g., it will be servoing on the first set of spirals), position error signals are collected for all spirals in a revolution. Accordingly, additional data is collected for performing repeatable runout compensation on the second set of spirals, without requiring additional revolutions of the disk surface and, hence, without requiring additional time.

After switching between the two sets of spirals, transients may be present in both the position correction values and the timing correction values. Methods for reducing such transients are discussed in U.S. Provisional Patent Application Ser. No. 60/475,043 entitled "Methods To Reduce Correction Value Transients At Spiral Switch Points" filed Jun. 2, 2003, which is incorporated by reference.

In another embodiment of avoiding collisions, the same number of spirals of servo information are written as compared to the number of final servo spokes. In this embodiment, the self-servo write process alternate between reading and writing at every other spiral. Accordingly, two revolutions of the disk would be required before the final servo information was completely written at a radial location (e.g., the read head would not incrementally seek to the next radial location for two revolutions).

Yet another embodiment includes using a ratio of M spirals per revolution to N servo spokes per revolution. In this embodiment, a recognition is made that there are instances where spiral servo information cannot be read while writing final servo information. In choosing M and N, such instances are reduced to a tolerable point. This embodiment may be especially useful when there is a very large runout between the spiral servo information and the final servo information (as may be the case when the disk becomes mis-centered after the spiral servo information has been written, but before the final servo patterns are written, e.g., disk slip). This embodiment may also be useful when the servo processor bandwidth is not capable of running at twice the sample rate of a standard servo system. In one embodiment, M is 2 and N is 1. In another embodiment, M is 8 and N is 7.

In order to write radially-coherent final servo patterns, timing information from the spiral servo pattern is used. The spiral servo pattern is written using a servo track writer in conjunction with a clock head and a phased locked loop system (in a manner similar writing conventional servo patterns). During the self-servo write process, spiral timing information is extracted and is input to a disk-locked clock. The disk-locked clock is a firmware-controlled phase-locked loop.

The input to the disk-locked clock is the sampling phase of the read signal envelope relative to an ADC clock in the channel. The firmware calculates a frequency correction to the channel clock VCO to null the error and to maintain radial coherence (e.g., to less than a nanosecond). An exact integer number of sample clocks are maintained from spiral-to-spiral in order to write coherent patterns from track-to-track while self-servo writing. This function is performed with a counter clocked from the disk-locked clock and gated with the detection of the sync mark found in the spiral pattern during the demodulation process. The firmware includes this counter in the control of the phase-locked loop to maintain a proper spacing of final pattern spoke-to-spoke timing, as well as writing a radially coherent servo pattern.

In one embodiment, spiral patterns are written at a relatively low velocity, so as to reduce acceleration and deceleration overshoots. In one embodiment, the spiral patterns are written at a velocity of about 5 inches per second. In another embodiment, the spiral patterns are written at a velocity of about 6 inches per second. In another embodiment, the spiral patterns are written at a velocity ranging between 5 inches per second and 6 inches per second. In one embodiment, the sync-to-sync spacing is equal to ¼ of a track of the final servo pattern.

Returning now to FIG. 14, in step 1420, the servo track writer is used to write a small band of conventional servo information onto the disk surface. It would be beneficial to develop a technique which did not require the servo track writer to write the small band of conventional servo information onto the disk surface, so that servo track writer time could be reduced.

Furthermore, as TPI increases, a significant capital investment may be required in enhancing existing servo track writers, so that the servo track writers scale with changes in TPI of the small band of conventional servo information. Accordingly, for this additional reason, it would be beneficial to develop a technique which did not require the servo track writer to write the small band of conventional servo information onto the disk surface.

SUMMARY OF THE INVENTION

The present invention is designed to meet some or all of the aforementioned, and other, needs.

The present invention is directed to a method and apparatus for performing a self-servo write operation in a disk drive using spiral servo information. In one embodiment, the disk drive includes a disk surface having a read head and a write head associated therewith. Spiral servo information is written onto the disk surface using the write head and a servo track writer. The read head reads the spiral servo information and is used to position the write head, which writes a small band of final servo information onto the disk surface. In one embodiment, the small band of final servo information may be embedded servo information. Importantly, the small band of final servo information is not written using the servo track writer.

The write head is used to write self-servo write instructions into the small band of final servo information. Subsequently, the self-servo write instructions are read and a self-servo write operation is performed using the spiral servo information.

In one embodiment, the final servo information is embedded servo information. Accordingly, the final servo information that has been written onto the disk surface looks substantially identical to a disk surface that has had its final servo patterns written using a servo track writer.

Other embodiments, objects, features and advantages of the invention will be apparent from the following specification taken in conjunction with the following drawings.

DETAILED DESCRIPTION OF THE PREFERRED EMBODIMENT

Figure 1:
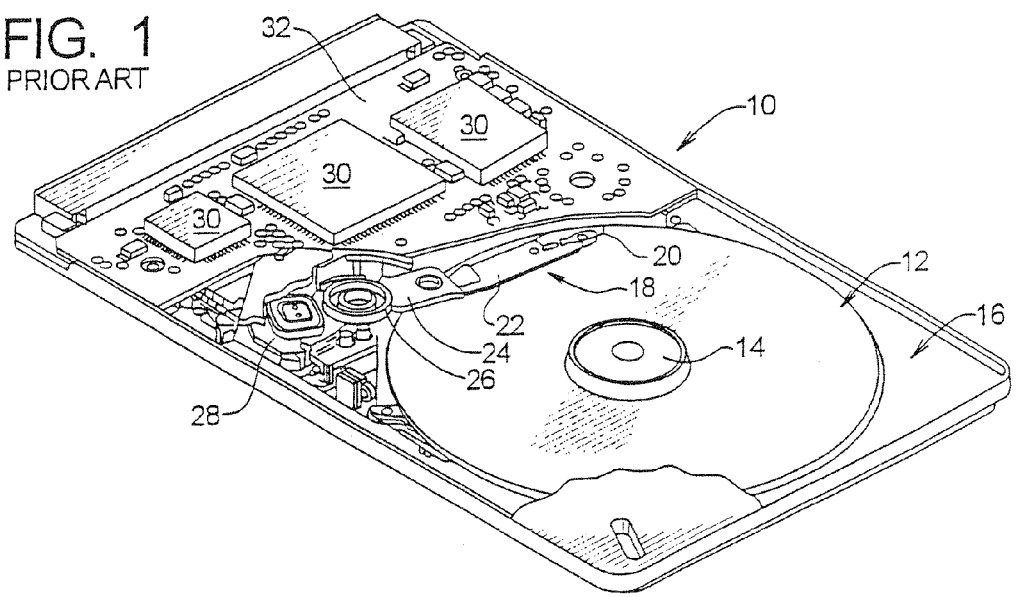
FIG. 1 is a diagrammatic representation illustrating a conventional disk drive with its top cover removed.
Figure 2:
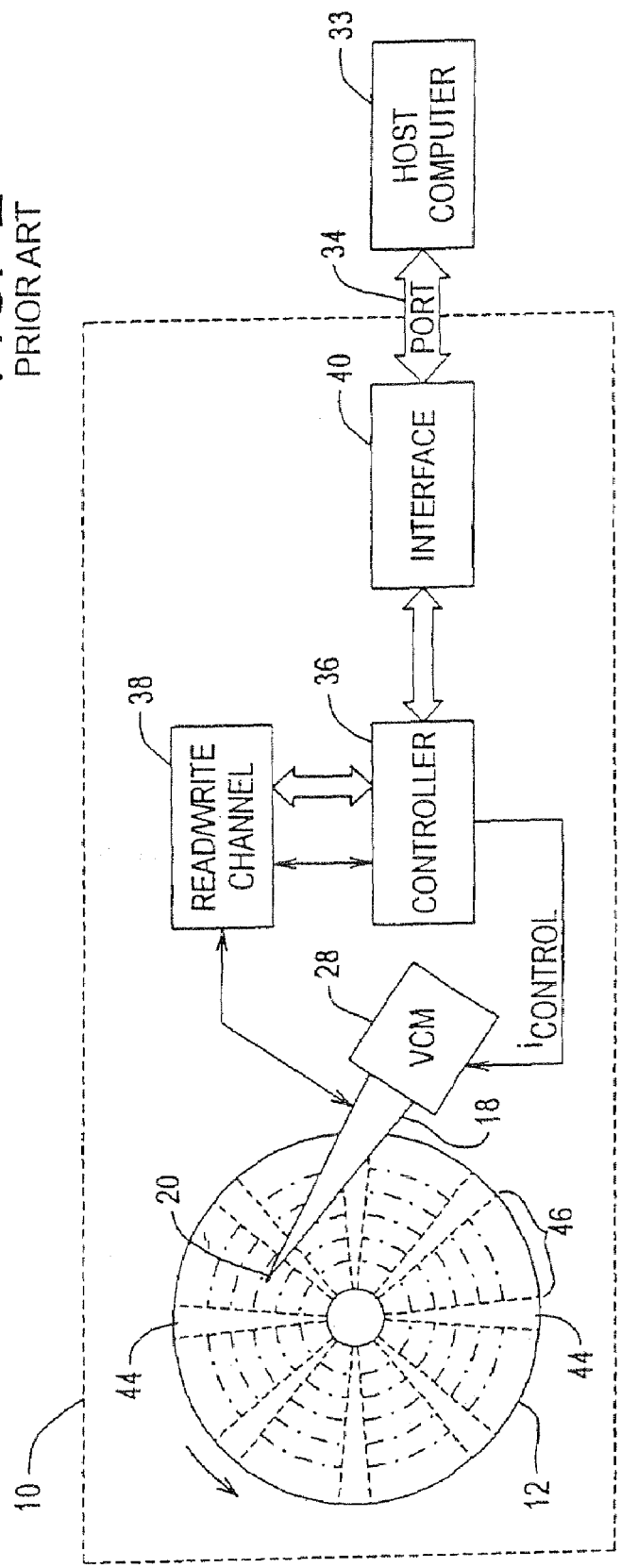
FIG. 2 is a functional block diagram which illustrates a conventional disk drive that is coupled to a host computer via an input/output port.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to a method and apparatus for performing a self-servo write operation in a disk drive using spiral servo information that has been written onto a disk surface. After the self-servo write operation has been performed, in one embodiment, the disk drive will have a disk surface formatted with final servo patterns like those shown in FIG. 3. Of course, other final servo pattern formats are possible and anticipated.

Figure 17:
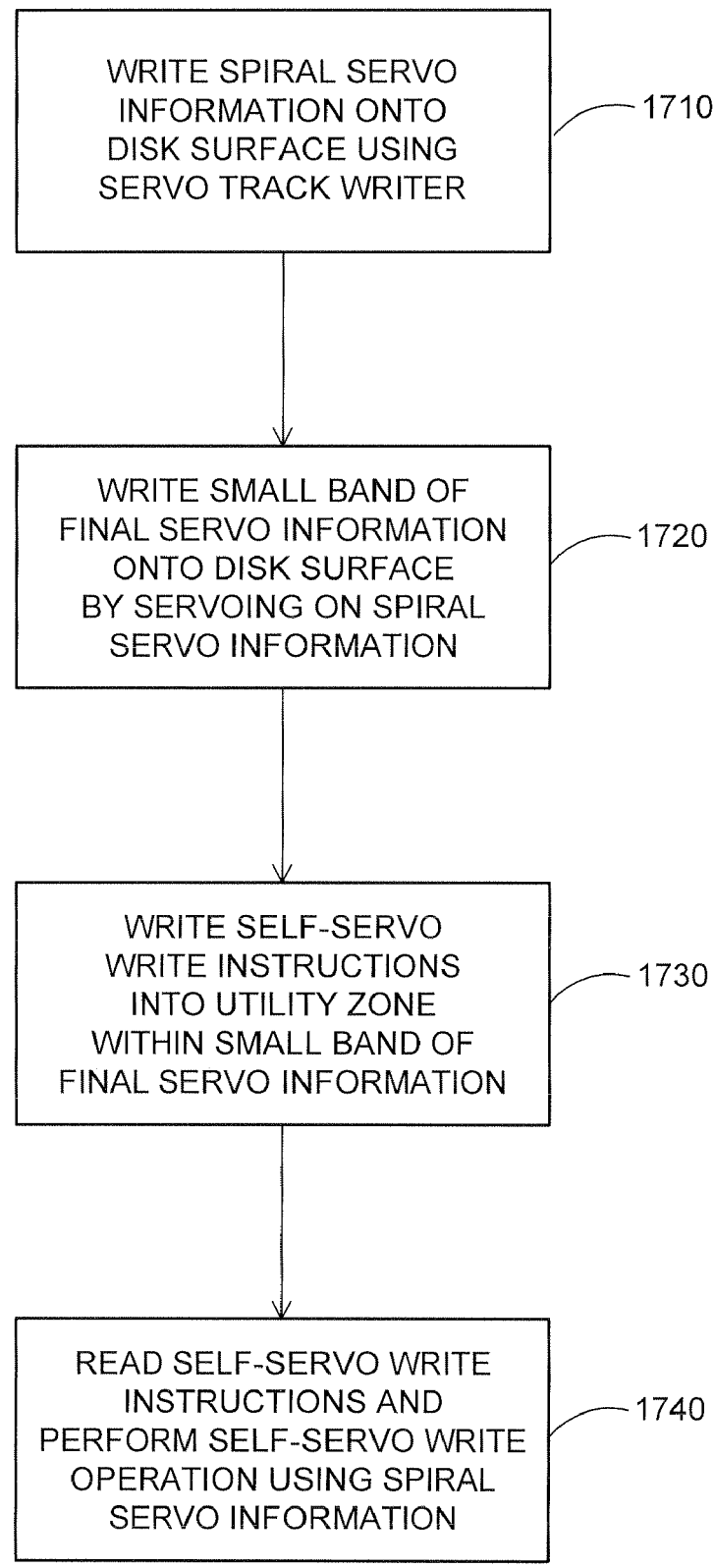
FIG. 17 illustrates an embodiment of the present invention.

One embodiment of the present invention is shown in FIG. 17. Specifically, with reference to FIG. 17, at a first station, a STW is used to write spirals of servo information onto the disk surface by moving a write head in a controlled (closed-loop) manner (e.g., at a constant velocity or along a velocity profile) across the disk surface while the disk is spinning (step 1710).

Next, the disk drive is moved out of the first station and into a second station, so as to free-up the STW for other disk drives. The second station preferably includes a host connection.

Figure 14:
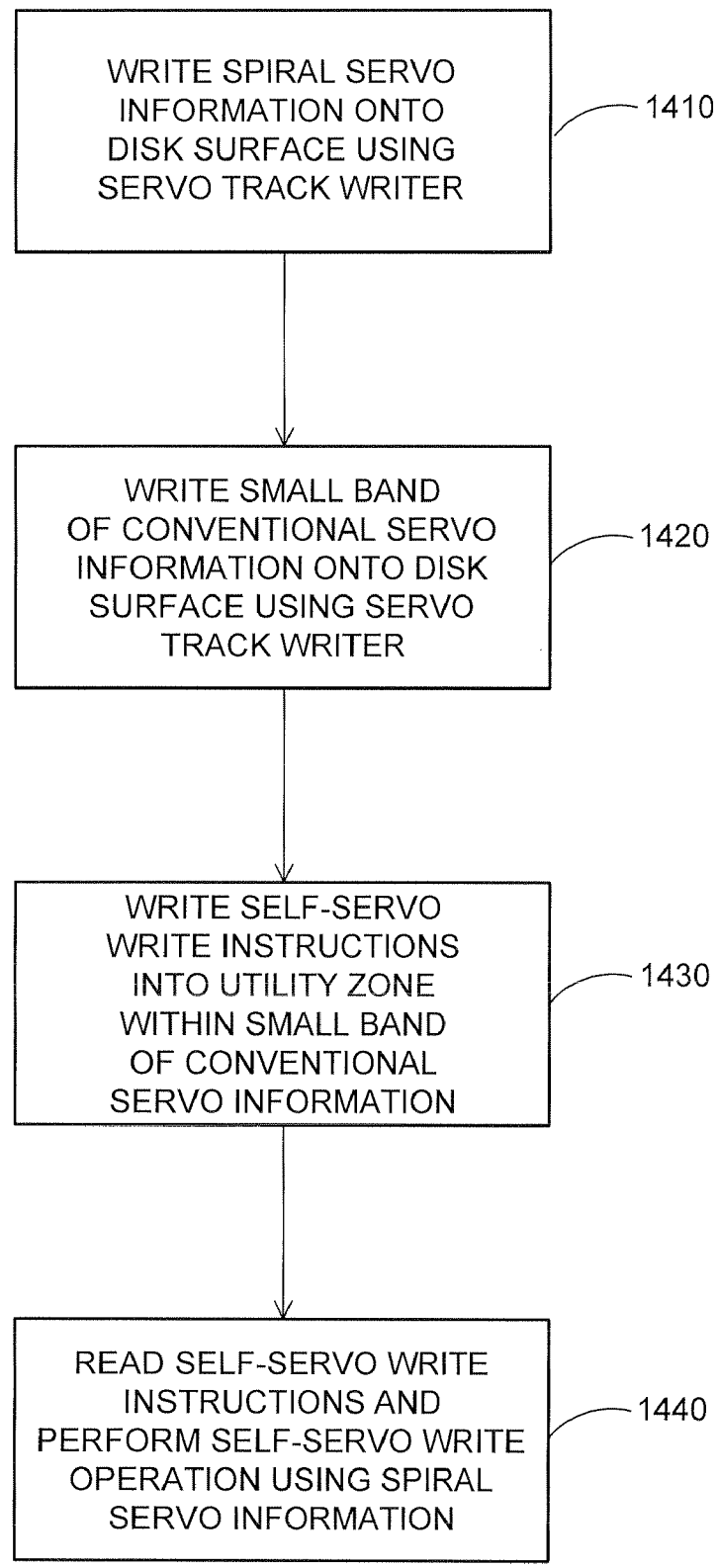
FIG. 14 is a flowchart illustrating a prior method of performing a self-servo write operation in a disk drive.
Figure 15:
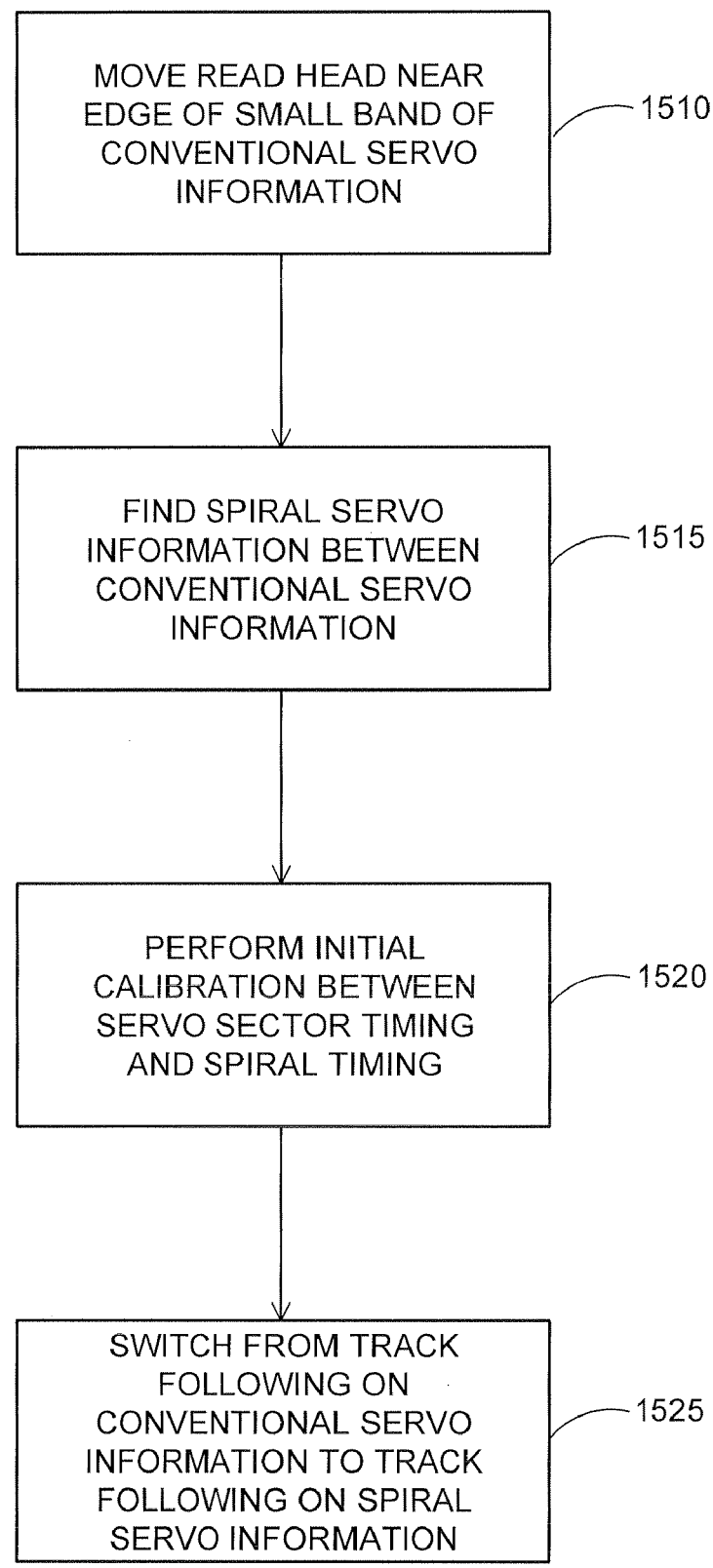
FIG. 15 is a flowchart used to describe a prior technique for moving from servoing on a small band of conventional servo information to servoing on spiral servo information in accordance with a prior technique.
Figure 16:
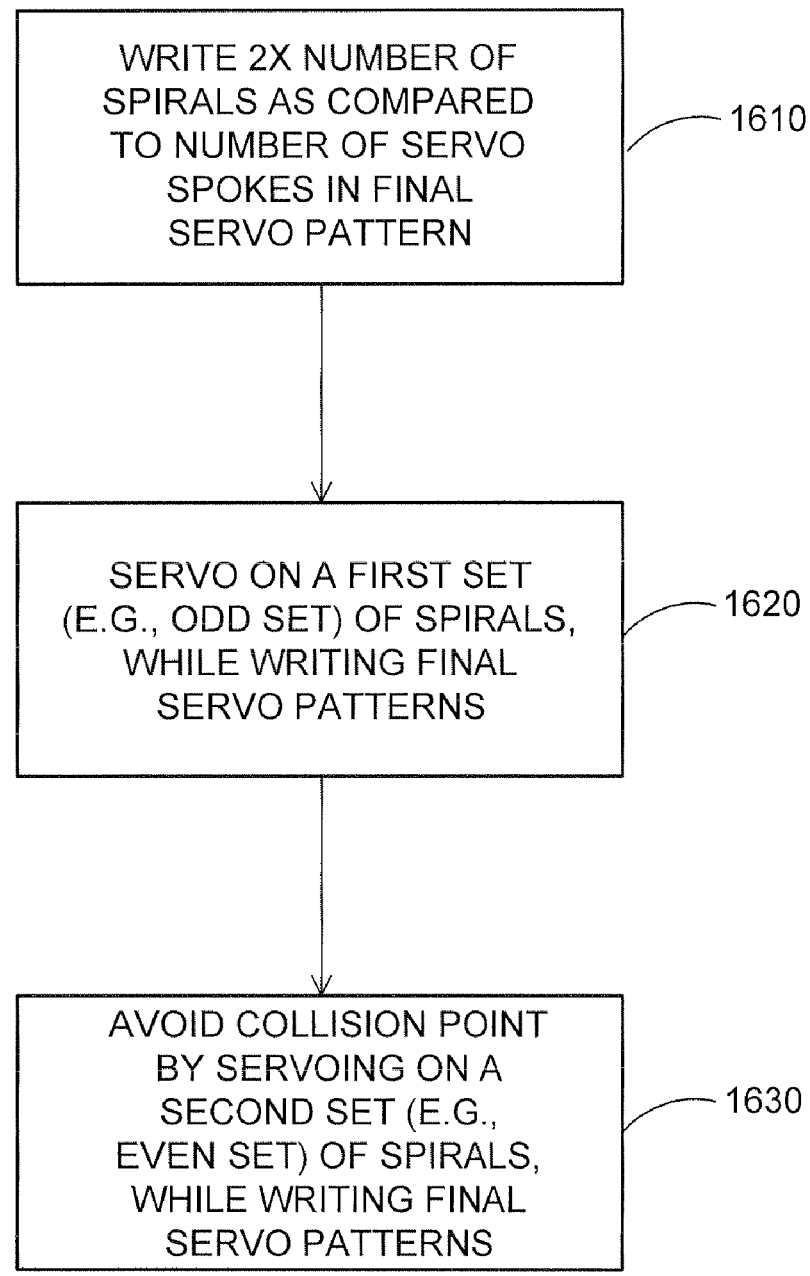
FIG. 16 is used to describe a prior technique for avoiding collisions, while self-servo writing.

At the second station, a small band of final servo information (e.g., embedded servo information as compared to spiral servo information) is written onto the disk surface (e.g., near its inner diameter or its outer diameter)(step 1720), wherein the small band of final servo information is analogous to the small band of conventional servo information in FIG. 14. However, in contrast to the prior technique shown in FIG. 14, the small band of final servo information is written by servoing on the spiral servo information rather than by using the STW. That is, the STW is not used to write the small band of final servo information onto the disk surface.

At the second station, which includes a host connection, self-servo writing instructions and other information (e.g., drive firmware, self-test script, read channel parameter tables and defect management lists) are written into a utility zone, which is comprised of a portion (e.g., a few tracks) of the small band of final servo information (step 1730).

Next, the disk drive is moved to a third station, where no host connection or other mechanical components need access to the drive. The disk drive is powered-on (e.g., with its normal supplies of +12 V and +5 V) and reads the self-servo writing instructions included in the utility zone, so as to undergo a self-servo write process using the spirals of servo information (step 1740). In one embodiment, the final servo pattern looks like the conventional servo pattern of FIG. 3.

Figure 18:
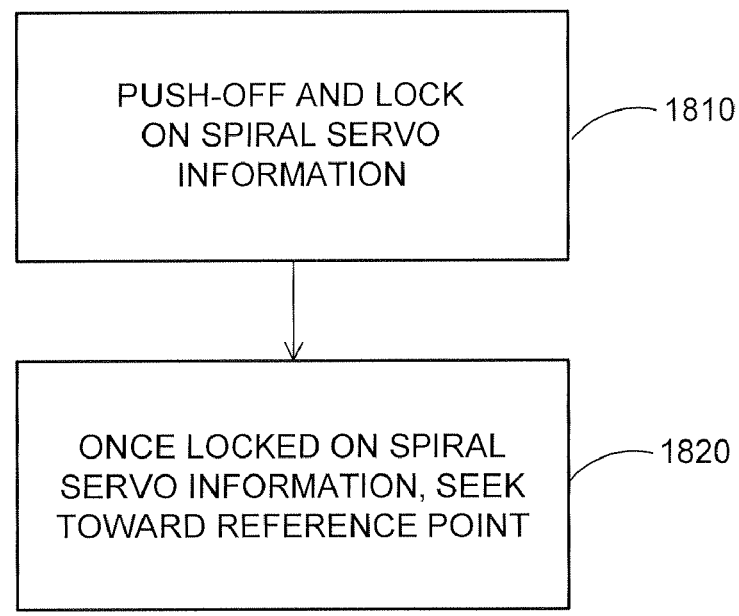
FIGS. 18 and 19 illustrate further details regarding embodiments of the present invention.
Figure 19:
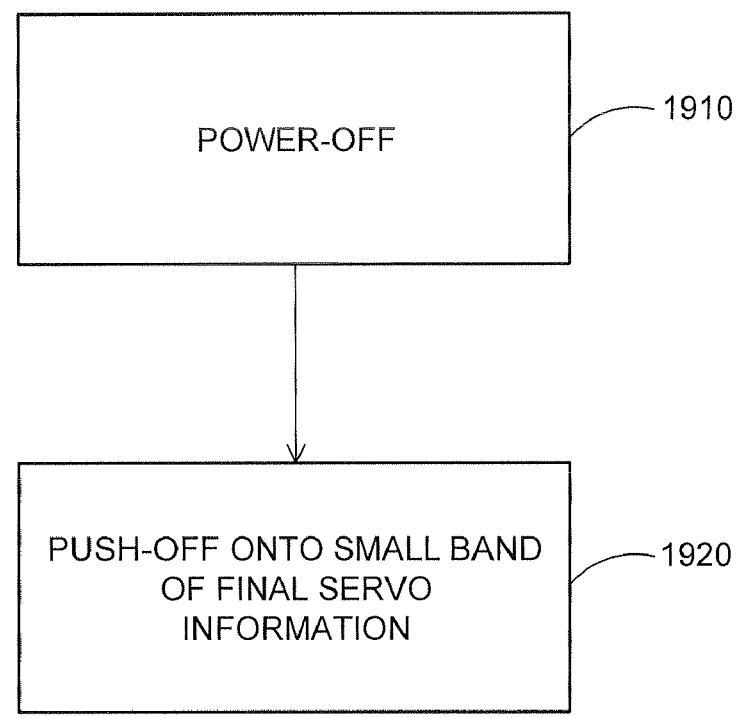

Further details regarding embodiments of the invention are discussed with reference to FIGS. 18 and 19. In the second station, prior to writing the small band of final servo information onto the disk surface (step 1720 of FIG. 17), the transducer pushes off and locks onto (or "acquires") the spiral servo information (step 1810).

There are many methods of pushing off and locking onto the spiral servo information. One example technique is described in U.S. patent application Ser. No. 10/858,846 entitled "Method And Apparatus For Acquiring Onto Spiral Servo Information Written On A Disk Surface Of A Disk Drive" filed on Jun. 2, 2004 and incorporated herein by reference. U.S. Provisional Patent Application Ser. No. 60/475,051 entitled "Asynchronous Pushoff And Acquire Onto Spiral Written Servo Format" filed Jun. 2, 2003 (from which the above-identified application claims priority) is also incorporated herein by reference.

Once the transducer has locked-onto the spiral servo information, a seek is performed using the spiral servo information to a radial reference point (step 1820). There are many methods of performing the seek. For example, at least one technique is described in U.S. patent application Ser. No. 10/858,830 entitled "Method And Apparatus For Performing Seek Operations In A Disk Drive Having A Disk Surface With Spiral Servo Information Written Thereon" filed on Jun. 2, 2004 and incorporated herein by reference. The above-identified patent application claims priority from both U.S. Provisional Patent Application Ser. No. 60/475,112 entitled "Incremental Seeking On Spiral Written Servo Format" filed Jun. 2, 2003 and U.S. Provisional Patent Application Ser. No. 60/475,127 entitled "Constant Acceleration Seek Algorithm For Spiral-Based Positioning System" filed Jun. 2, 2003, both of which are incorporated herein by reference.

Furthermore, the radial reference point can be designated using a variety of techniques. For example, the radial reference point may be the end of one of the spirals. As another example, the radial reference point may be designated and located using the techniques disclosed in U.S. patent application Ser. No. 10/859,061 entitled "Method And Apparatus For Providing An Absolute Reference Point On A Disk Of A Disk Drive That Has Spiral Servo Patterns Written Thereon" filed Jun. 2, 2004, which is incorporated herein by reference. The above-identified patent application claims priority from U.S. Provisional Patent Application Ser. No. 60/475,126 entitled "Methods To Find Absolute Reference Point On Spiral-Only-Written Disk" filed Jun. 2, 2003, which is incorporated herein by reference. In addition to providing methods to designate a radial reference point, the above-identified patent applications also provide techniques for determining a circumferential reference point.

After steps 1810 and 1820 have been performed, the small band of final servo information is then written relative to the radial reference point by servoing on the spiral servo information (see, step 1720 of FIG. 17). Of course, the small band of final servo information may also be written relative to a circumferential reference point.

Because the drive does not have self-servowriting instructions written on any of its disk surfaces, the host provides self-servowriting instructions to the disk drive to enable it to write the small band of final servo information. The self-servowriting instructions, for example, are stored in the disk drive's RAM.

While still in the second station, the drive is then powered-off (step 1910). When the drive is powered-on, the transducer is pushed-off onto the small band of final servo information (step 1920). There are several techniques of pushing-off the transducer onto the small band of final servo information. One technique is described in U.S. Provisional Patent Application Ser. No. 60/475,039 entitled "BEMF Controlled Push Off/Acquire" filed Jun. 2, 2003, which is incorporated herein by reference.

Once the drive has come ready on the small band of final servo information, the small band of final servo information (including the utility zone) is scanned for defects. Areas containing flaws are mapped out, so that they will not be used.

Figure 3:
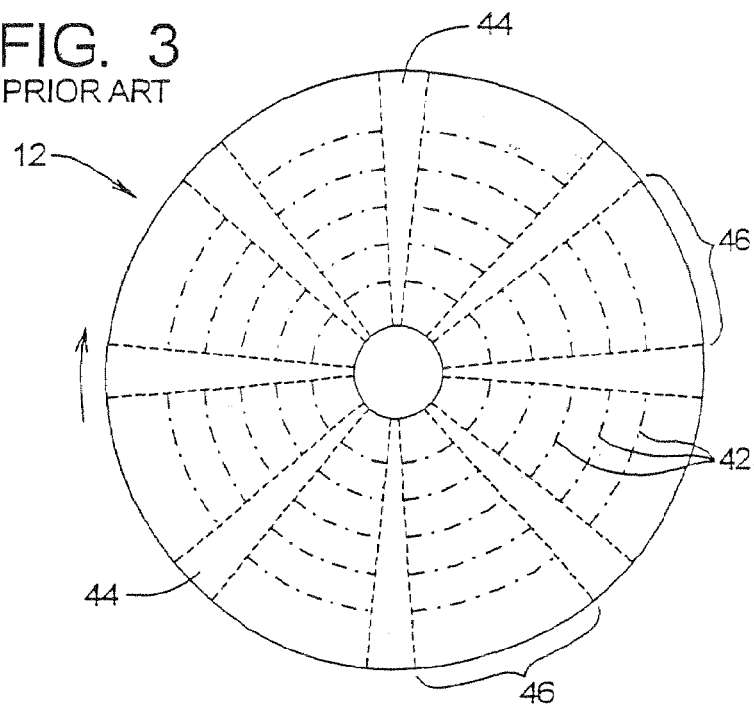
FIG. 3 is a diagrammatic representation of a top view of a magnetic storage disk illustrating a typical organization of data on a disk surface.
Figure 4:
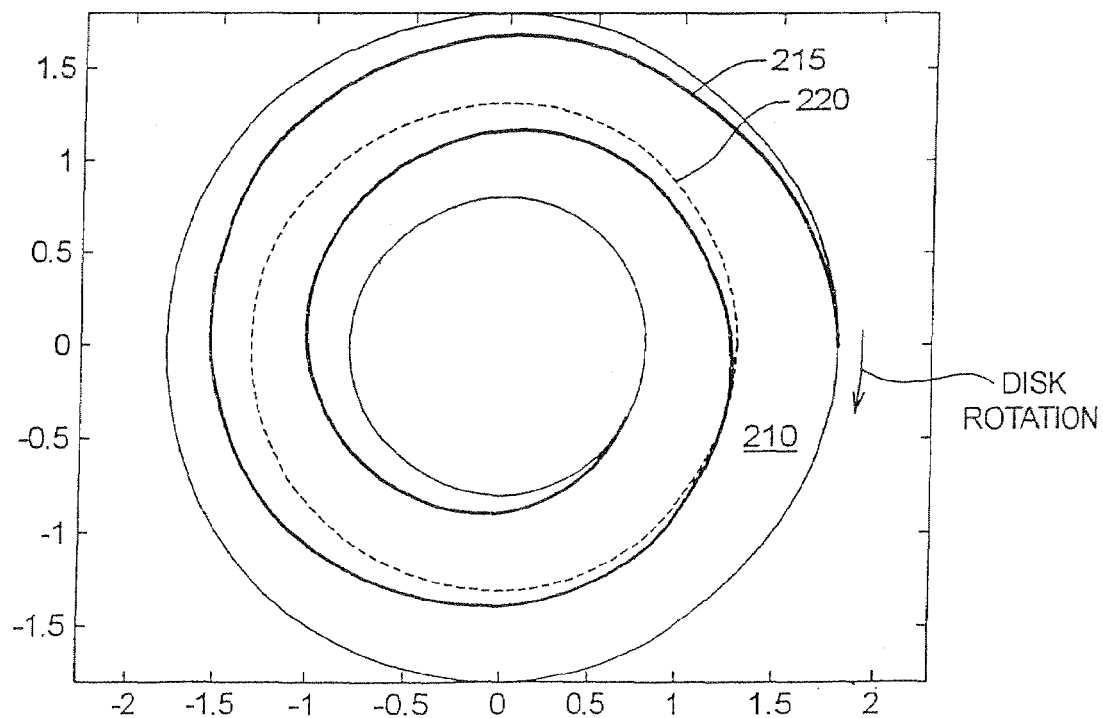
FIG. 4 is a diagrammatic representation of a disk surface having a spiral of servo information written thereon, along with a circular data storage track.
Figure 5:
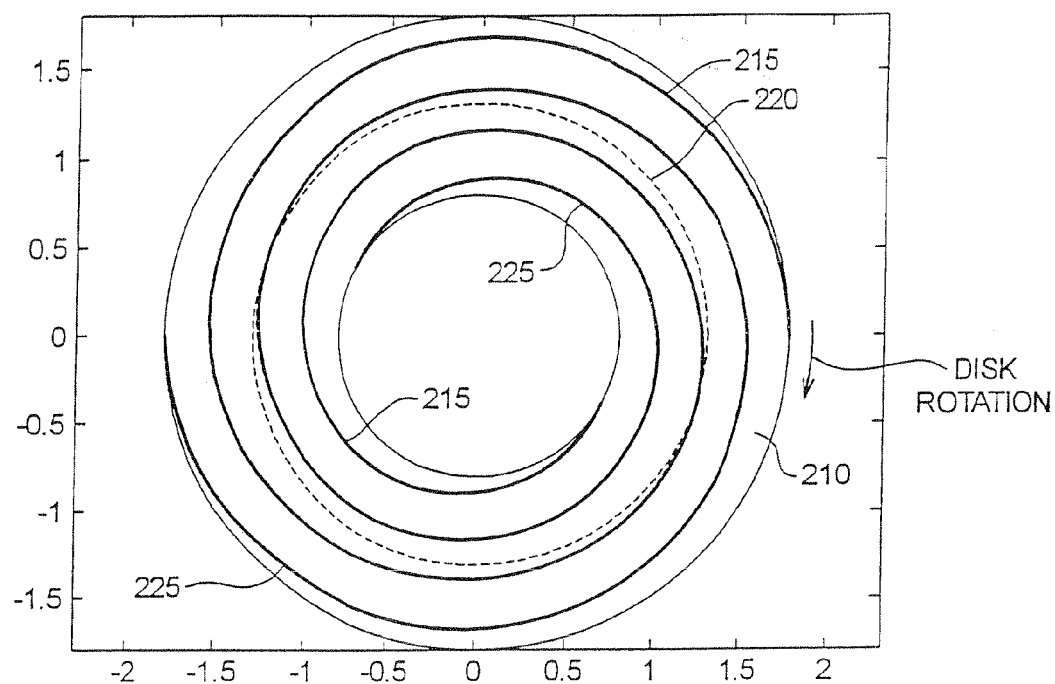
FIG. 5 is a diagrammatic representation of a disk surface having two spirals of servo information written thereon, along with a circular data storage track.
Figure 6:
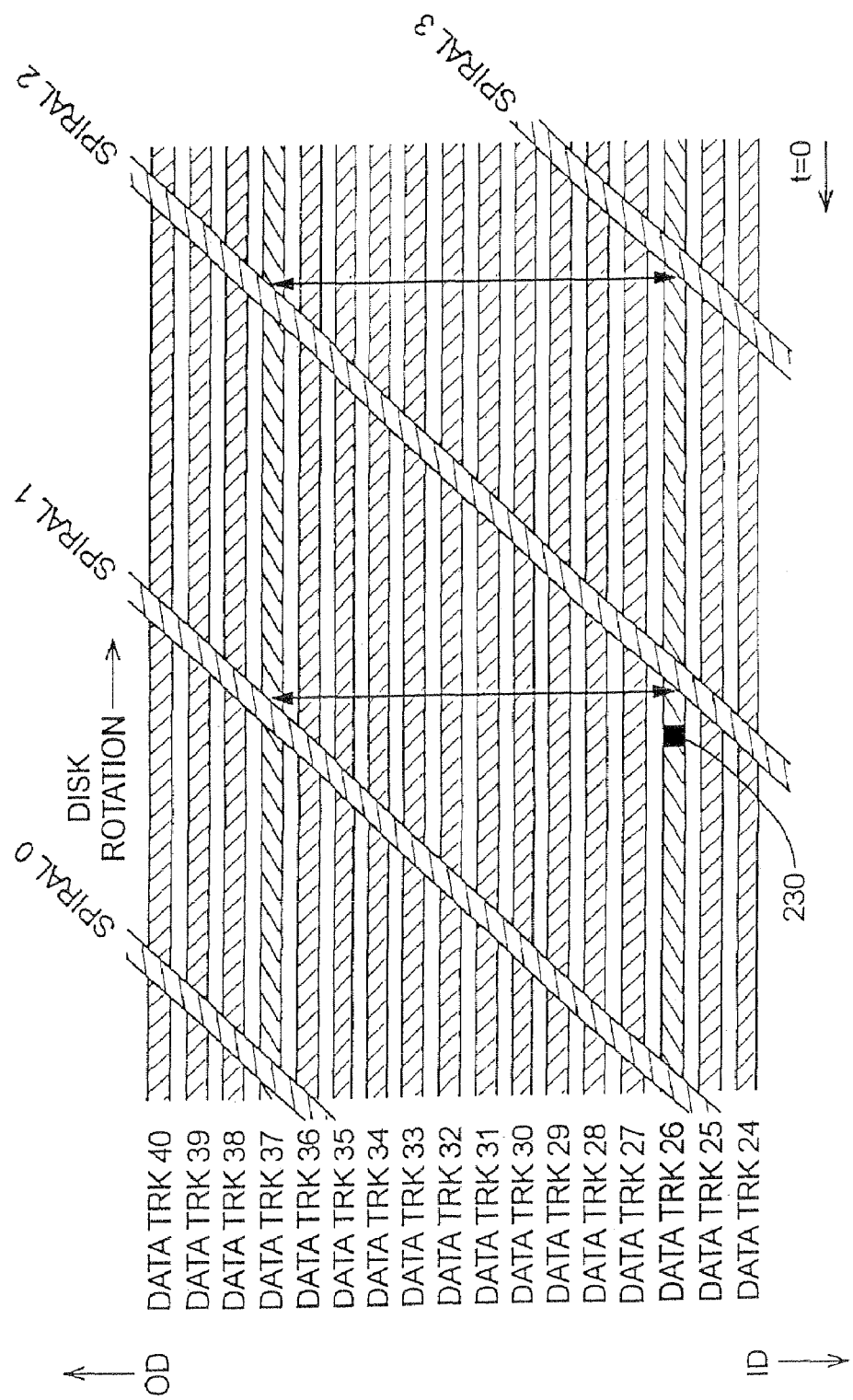
FIG. 6 is a diagrammatic representation of a magnified view of a portion of FIG. 5 showing additional spirals of servo information in a linear, instead of arcuate fashion, for ease of depiction.
Figure 7:
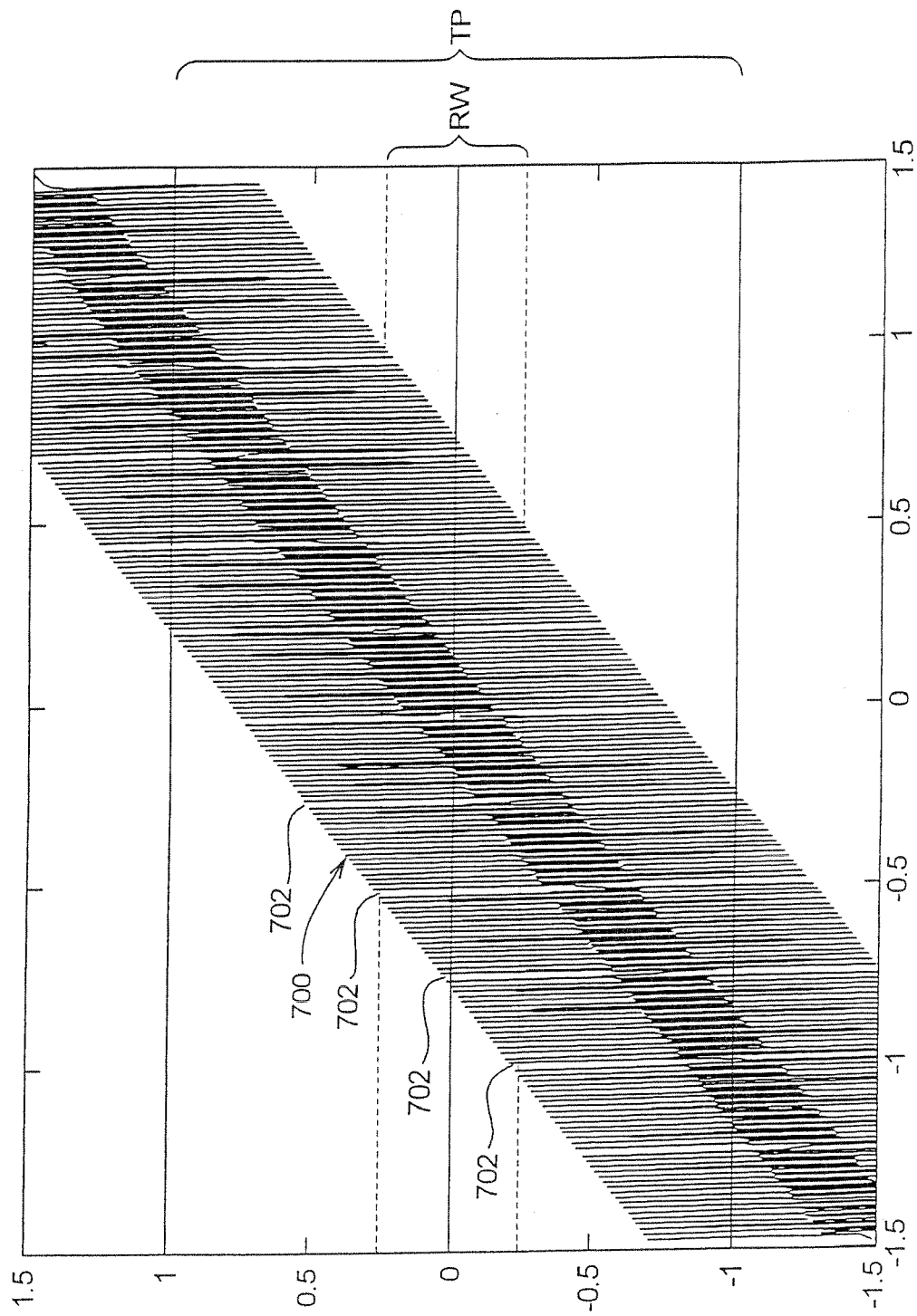
FIG. 7 is a diagrammatic representation of a magnified portion of one of the spirals of servo information shown in FIG. 6.
Figure 8:
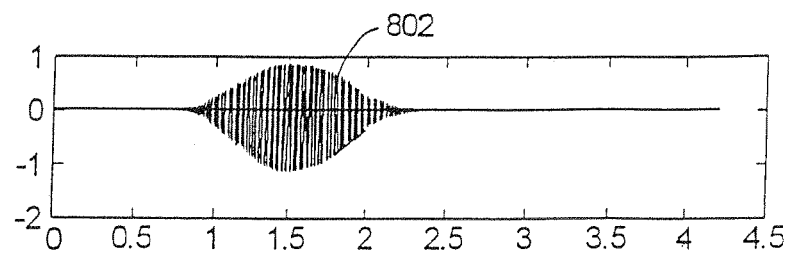
FIG. 8 is a diagrammatic representation of a read signal that is generated as the reader reads a portion of a spiral of servo information while the disk is spinning.
Figure 9:
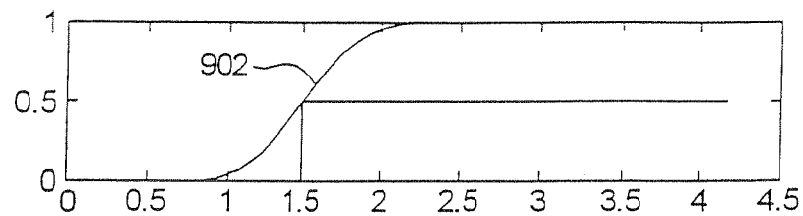
FIG. 9 is a diagrammatic representation of an integration curve in normalized units.
Figure 10:
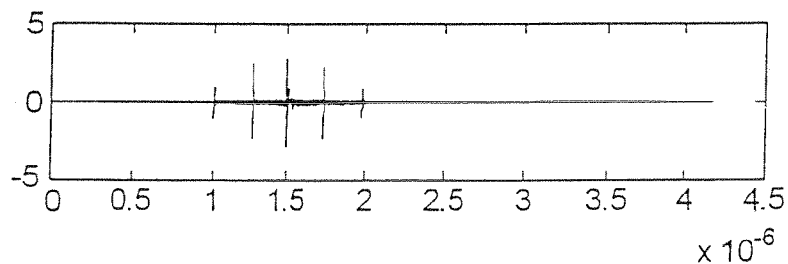
FIG. 10 is a diagrammatic representation illustrating five (5) sync marks in a read signal envelope.
Figure 11:
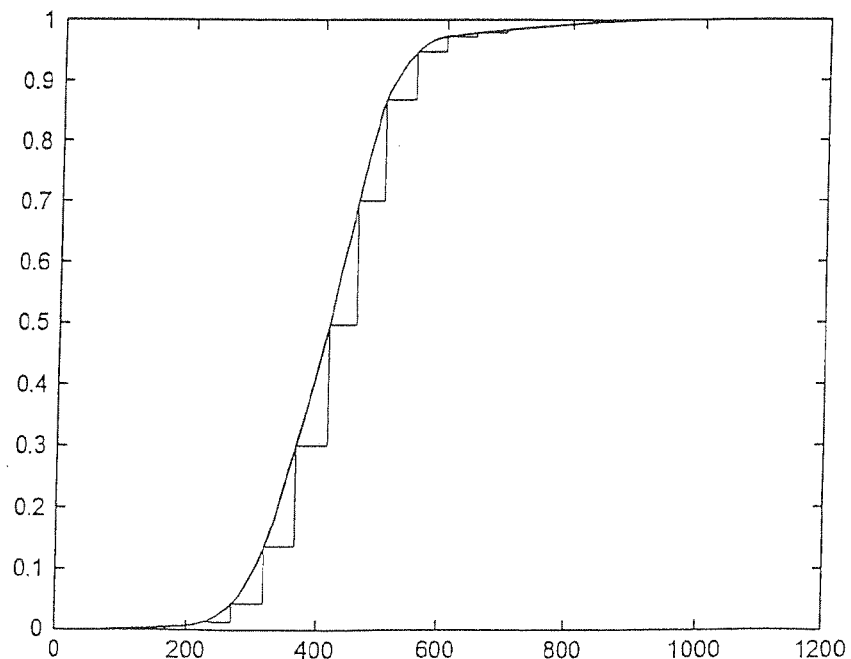
FIG. 11 is a diagrammatic representation of exemplary saved integrator values.
Figure 12:
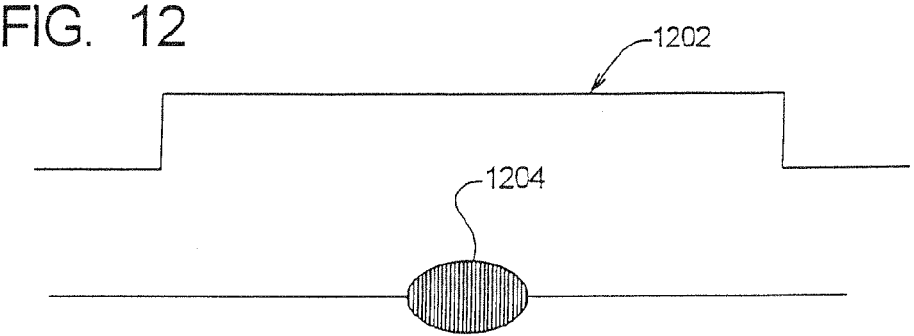
FIG. 12 is a schematic representation of an integration window and a read signal envelope, wherein the read signal envelope is centered in the integration window.
Figure 13A:
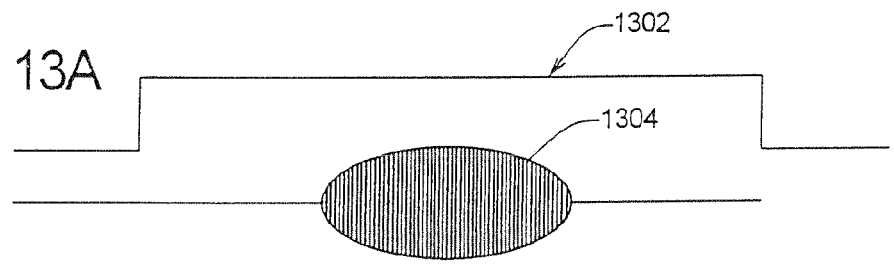
FIG. 13A is a schematic diagram illustrating a read signal envelope that is centered in an integration window.
Figure 13B:
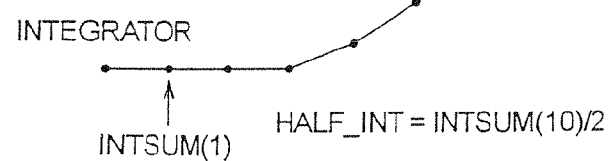
FIG. 13B is a schematic diagram illustrating a curve representing accumulated integration values across the integration window of FIG. 13A.

With reference again to FIG. 17, then, self-servo write instructions are written into the utility zone within the small band of final servo information (step 1730) via the host connection. Finally, as mentioned above, the drive is transported to a next station, where the drive is again powered-on, such that it reads the self-servo write instructions from the utility zone and performs a self-servo write operation using the spiral servo information, so that final servo patterns, which may look like the servo patterns shown in FIG. 3, are written onto the disk surface (step 1740).

It should be understood that the small band of final servo information will generally be part of the final servo patterns. However, it should also be understood that the small band of final servo information does not necessarily have to be part of the final servo patterns.

The small band of final servo information preferably occupies less than 3% of the disk surface. More preferably, the small band of final servo information occupies less than 1% of the disk surface. Even more preferably, the small band of final servo information occupies less than about 0.4% of the disk surface.

In one embodiment, the self-servo writing instructions and other information may be written to a temporary utility zone and then moved to a final utility zone as discussed in U.S. patent application Ser. No. 10/859,058 entitled "Method And Apparatus For Providing A Temporary Utility Zone In A Disk Drive" filed on Jun. 2, 2004 and incorporated herein by reference. U.S. Provisional Patent Application Ser. No. 60/475,097 filed Jun. 2, 2003 (from which the above-identified patent application claims priority) is also incorporated herein by reference.

Although three different stations were described above, it should be understood that the present invention is not limited to the stations in which the above-described operations are performed. More or less stations may be provided and certain operations may be combined or divided between stations. For example, in one embodiment, one or more of the actions described as being performed in the third station may be performed in the second station. As another example, at least one disk surface may completely be self-servo written using spiral servo information while being connected to a host.

It should be understood that aspects of the present invention are not limited by the manner in which spiral servo information is written onto the disk surface. Accordingly, the present invention may be used in conjunction with spiral servo information that has been placed on a disk surface using techniques associated with printed media or patterned media processes, among other processes.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
    writing spiral servo information onto a disk surface of a disk drive;
    writing a small band of final servo information onto the disk surface by servoing on the spiral servo information;
    writing self-servo write instructions in the small band of final servo information.

2. The method of claim 1 further including the step of:
    reading the self-servo write instructions and writing final servo patterns onto the disk surface.

3. The method of claim 1 wherein said disk drive includes a read head and a write head, wherein the read head is used to read both the self-servo write instructions and the spiral servo information, and wherein the write head is used to write both the self-servo write instructions and the final servo patterns.

4. The method of claim 1 wherein the spiral servo information is written onto the disk surface in a closed-loop fashion.

5. The method of claim 1 wherein a servo track writer is used to write the spiral servo information and wherein the servo track writer is not used to write the small band of final servo information.

6. The method of claim 1 wherein the self-servo write instructions are written into a utility zone that is located within the small band of final servo information.

7. The method of claim 1 including the step of:
    locking onto spiral servo information prior to writing the small band of final information.

8. The method of claim 7 including the step of:
    seeking to a radial reference point after locking onto the spiral servo information.

9. The method of claim 7 including the step of:
    seeking to a radial and circumferential reference point after locking onto the spiral servo information.

10. The method of claim 1 including the step of:
    powering-off the disk drive after writing the small band of final servo information but before writing the self-servo write instructions into the small band of final servo information.

11. The method of claim 10 including the step of:
    locking onto the small band of final servo information after powering-on the drive.

12. The method of claim 11 wherein the self-servo write instructions are written after locking onto the small band of final servo information.

13. The method of claim 11 wherein the self-servo write instructions are written after scanning the small band of final servo information for defects.

14. A method comprising the steps of:
    providing a disk surface of a disk drive that has spiral servo information written thereon;

writing a small band of final servo information onto the disk surface by servoing on the spiral servo information;

writing self-servo write instructions in the small band of final servo information.

15. The method of claim 14 further including the step of:

reading the self-servo write instructions and writing final servo patterns onto the disk surface.

16. An apparatus comprising:

a disk surface, said disk surface having a write head associated therewith, wherein spiral servo information is written onto the disk surface using the write head;

a read head associated with both the disk surface and the write head, wherein the read head reads the spiral servo information, wherein the write head is positioned in response to the read head reading the spiral servo information to write a small band of final servo information, and wherein the write head writes self-servo write instructions into the small band of final servo information.

17. The apparatus of claim 16 wherein the read head reads the self-servo write instructions and the write head writes final servo patterns onto the disk surface.

18. The apparatus of claim 16 wherein a servo track writer is used in conjunction with the write head to write the spiral servo information and wherein the servo track writer is not used to write the small band of final servo information.

19. The apparatus of claim 16 wherein the self-servo write instructions are written into a utility zone that is located within the small band of final servo information.

20. The apparatus of claim 16 wherein the read head locks onto spiral servo information prior to the write head writing the small band of final servo information.

21. The apparatus of claim 20 wherein the read head seeks to a radial reference point after locking onto the spiral servo information.

22. The apparatus of claim 20 wherein the read head seeks to a radial and circumferential reference point after locking onto the spiral servo information.

23. The apparatus of claim 16 wherein the disk drive is powered-off after the write head writes the small band of final servo information but before the write head writes the self-servo write instructions into the small band of final servo information.

24. The apparatus of claim 23 wherein the read head locks onto the small band of final servo information after powering-on the drive.

25. The apparatus of claim 24 wherein the self-servo write instructions are written by the write head after the read head locks onto the small band of final servo information.

26. The apparatus of claim 24 wherein the self-servo write instructions are written by the write head after scanning the small band of final servo information for defects.

* * * * *